No. 735,352. PATENTED AUG. 4, 1903.
G. S. DUNN.
SYSTEM OF ELECTRICAL DISTRIBUTION.
APPLICATION FILED JUNE 18, 1903.
NO MODEL.
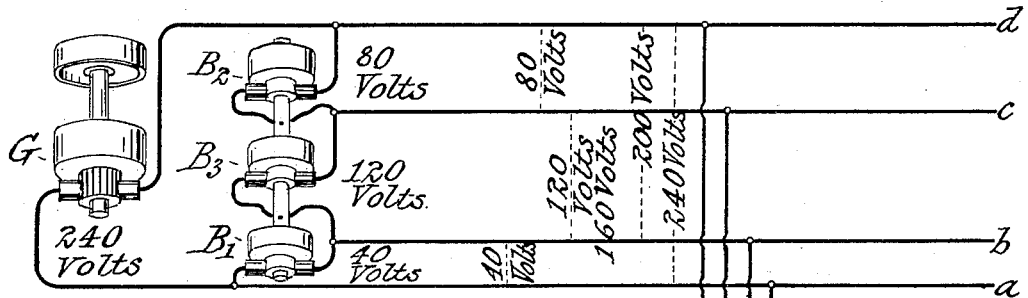
Fig. 1.
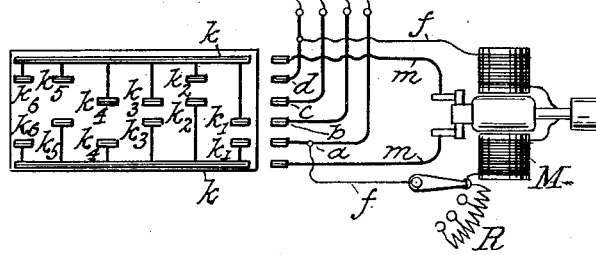
Fig. 2.
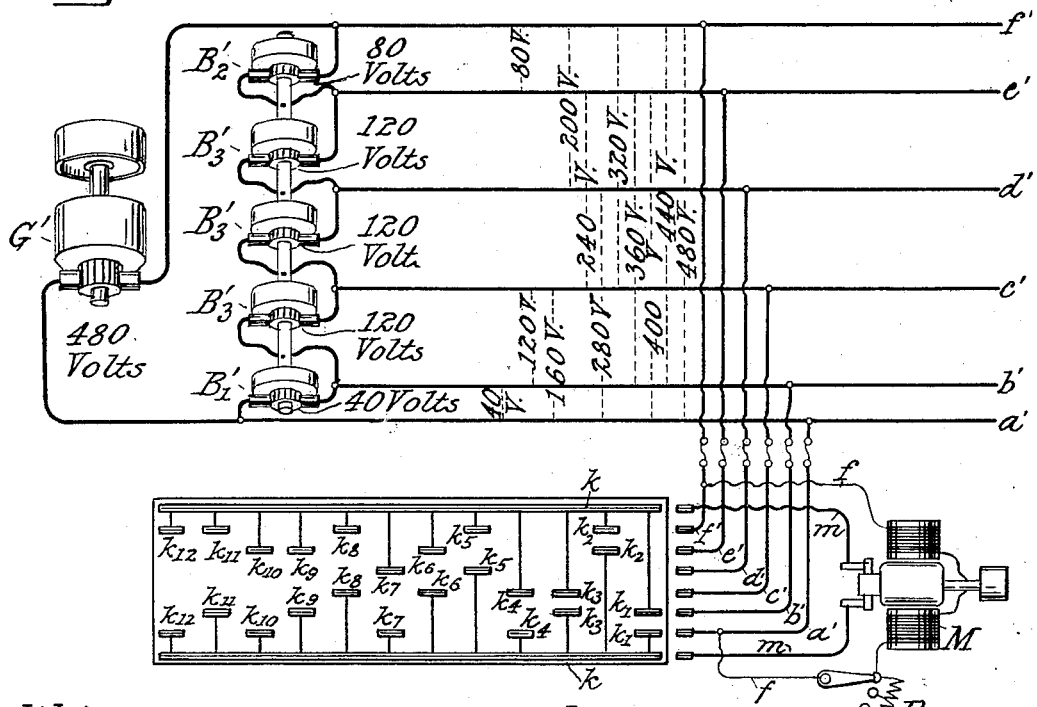
Witnesses:
Samuel W. Balch
Vernon W. Ansey
Inventor,
Gano S. Dunn,
by Thomas Ewing, Jr.
Attorney.

No. 735,352. Patented August 4, 1903.

UNITED STATES PATENT OFFICE.

GANO S. DUNN, OF EAST ORANGE, NEW JERSEY, ASSIGNOR TO CROCKER-WHEELER COMPANY, OF AMPERE, NEW JERSEY, A CORPORATION OF NEW JERSEY.

SYSTEM OF ELECTRICAL DISTRIBUTION.

SPECIFICATION forming part of Letters Patent No. 735,352, dated August 4, 1903.

Application filed June 18, 1903. Serial No. 162,083. (No model.)

*To all whom it may concern:*

Be it known that I, GANO S. DUNN, a citizen of the United States of America, and a resident of East Orange, county of Essex, and State of New Jersey, have invented certain new and useful Improvements in Systems of Electrical Distribution, of which the following is a specification.

This invention relates to multiple-voltage systems of electrical distribution by means of four or more conductors. There are interconnected sources of electric-current supply for the conductors, and current can be drawn from the conductors for the supply of motors or other translating devices by connecting the two terminals of each of such motors or devices to any two of the conductors. The conductors of the system are supplied with sufficient current for the simultaneous operation of a plurality of motors or other devices which may be connected to the same or different conductors. The sources of supply are arranged to maintain definite potential differences or voltages between each conductor and each other conductor of the system and supply current at such voltages and in such direction that with respect to any one conductor the potential difference of each of the other conductors will have either a different value or a different sign. In consequence the conductors can be arranged in an order of rising potential. The object of the multiplicity of conductors is to afford a choice of different voltages or potentials with which the motor or other device may be supplied. That there may be a considerable number of different voltages some or all of the values of the differences of potential between the different pairs of conductors adjacent to each other in the order of arrangement are also unequal. That this choice may be as great as possible with any given number of conductors certain proportional relations between the differences of potential maintained between the different pairs of conductors must be observed.

The object of this invention is to provide means for maintaining potential differences between the conductors of the series of such values that there will be a choice of potential differences or voltages greater than the number of conductors and of voltages that, taken in the order of their values, form substantially an arithmetical progression in which the first step of the progression and the differences between successive steps will be substantially equal to each other and to the fractional part of the last step in the progression resulting from the division of the potential difference of the last step of the progression by the number of steps.

The invention has been particularly devised for motor regulation. In order that a motor may be run at different speeds, currents of a number of different voltages are provided, together with switch-control apparatus for effecting the connections to the motor for the desired voltage and for effecting these connections in the order of the increase in value until the desired potential difference or the maximum potential difference, which is usually the voltage at which the motor is rated, is supplied to the motor. As each change of connections is made to a next higher voltage an excess of current over that to which the motor has adjusted itself is suddenly thrown on the motor-armature, and there is a momentary rush of current approximately proportional to the increase in the voltage which causes sparking at the commutator, if excessive, and shock to the motor and machinery. It is desirable, therefore, that the increase of voltage at each of the steps, including the step from the position of no voltage to the first voltage position, should be of small value. This is the case if the voltage increase is evenly distributed between the steps, and hence the successive potential differences form an arithmetical progression. Then the voltage change at each step will be of a lower value for any given number of steps and given maximum potential difference than it would be at some of the steps if they were unequal.

In the accompanying sheet of drawings, which forms a part of this specification, Figure 1 is a diagrammatic view of a specific means of carrying out the invention in a multiple-voltage system of electric-motor control with four main conductors, suitable sources of supply for the conductors, a motor, and a controller for changing the connections of the motor and conductors whereby six different voltages in an arithmetical series can be supplied to the motor. Fig. 2 is a diagrammatic view of a similar multiple-voltage system of electric-motor control with six main conductors, a motor, and a controller for changing the connections of the motor and conductors whereby twelve different voltages in an arithmetical series can be supplied to the motor.

In the system illustrated in Fig. 1 there are four conductors $a$ $b$ $c$ $d$, between which there is a continuous rise or fall of potential in the order named. Between the extreme conductors $a$ and $d$ a difference of potential of two hundred and forty volts is maintained by a generator G. The conductors $b$ and $c$ are maintained at intermediate potentials with respect to the extreme conductors by means of a balancer consisting of three mechanically-connected dynamo-electric machines $B'$, $B^2$, and $B^3$, which are so proportioned and wound that they will maintain potential differences between their armature-terminals in the ratios one, two, and three, respectively, when running together. These machines are connected in series between the extreme conductors in the order $B'$ $B^3$ $B^2$, and they will consequently subdivide the rise or fall of potential of two hundred and forty volts between the extreme conductors into the values—forty volts, one hundred and twenty volts, and eighty volts—between the intermediate conductors in the order named. These machines constituting the balancer act in part as motors and in part as generators to maintain the requisite potential differences between the conductors. The machines which act as generators and which act as motors will depend on the relative amounts of current drawn from the several conductors. By reason of the interconnections of the generator and machines of the balancer a circuit can always be traced from any one of two conductors which are being drawn upon to supply a motor through the main generator or through one or two of the machines of the balancer which may be acting as generators to the other conductor. The conductor $b$ is connected between the machines $B'$ and $B^3$, and the conductor $c$ is connected between the machines $B^3$ and $B^2$. Between the conductors $a$ and $b$ the machine $B'$, which is wound for forty volts, is connected and maintains a potential difference of forty volts, which is the unit-potential difference of the system as illustrated. Between the conductors $c$ and $d$ the machine $B^2$, which is wound for eighty volts, is connected and maintains a potential difference of eighty volts, which is double the unit potential difference. Between the conductors $b$ and $c$ the machine $B^3$, which is wound for one hundred and twenty volts, is connected and maintains a potential difference of one hundred and twenty volts, which is three times the unit potential difference. Between the conductors $a$ and $c$ the machine $B'$, yielding forty volts, and the machine $B^3$, yielding one hundred and twenty volts, are in series and maintain a potential difference of one hundred and sixty volts. Between the conductors $b$ and $d$ the machine $B^3$, yielding one hundred and twenty volts, and the machine $B^2$, yielding eighty volts, are in series and maintain a potential difference of two hundred volts. Between the conductors $a$ and $d$ the main generator G maintains a potential difference of two hundred and forty volts. These six different voltages form an arithmetical progression, beginning with the common arithmetical difference of forty volts. They are therefore in the ratios of the numbers one, two, three, four, five, six. The only arithmetical progression possible in an interconnected four-conductor system providing for six potential differences in series is with the voltages in the ratios of these numbers, with the third voltage of the series between the two intermediate conductors and the first and second voltages of the series each between one of the extreme conductors and one of the intermediate conductor when the conductors are arranged in the order of rising potential.

A controller is provided which by consecutive movements in one direction connects the armature of the motor M with the different pairs of the conductors in the order in which the pairs are enumerated above. For this purpose it has in sequence, first, a pair of contacts $k'$ $k'$, which connect the motor-terminals with the conductors $a$ and $b$; second, a pair of contacts $k^2$ $k^2$, which connect the motor-terminals with the conductors $c$ and $d$; third, a pair of contacts $k^3$ $k^3$, which connect the motor-terminals with the conductors $b$ and $c$; fourth, a pair of contacts $k^4 k^4$, which connect the motor-terminals with the conductors $a$ and $c$; fifth, a pair of contacts $k^5$ $k^5$, which connect the motor-terminals with the conductors $b$ and $d$, and, sixth, a pair of contacts $k^6$ $k^6$, which connect the motor-terminals with the conductors $a$ and $d$. In all of the positions of the controller the field of the motor is supplied from the same pair of conductors and preferably from the conductors $a$ and $d$, between which there is the greatest potential difference. A rheostat R is inserted in the field-circuit, and by introducing resistance in the field-circuit the field can be weakened for the purpose of obtaining speeds for the motor which are intermediate between the speeds resulting from the voltage changes in the armature-circuit. The connection of the field-coils with the same two conductors is maintained in all the operative positions of the controller, and the field-circuit is from conductor $a$ through lead $f$, rheostat R, the field-coils of the motor M, and the other lead $f$ to conductor $d$. In the first operative position of the controller, as illustrated, the armature-circuit is from conductor $a$ to one of the contacts $k'$ to the lower contact $k$, armature-lead $m$, armature, the other armature-lead $m$, the upper contact $k$, and the other contact $k'$ to lead $b$. In the second operative position of the controller the armature-circuit is from conductor $c$ to one of the contacts $k^2$, to the lower contact $k$, armature-lead $m$, armature, the other armature-lead $m$, the upper contact $k$, and the other contact $k^2$ to lead $d$. In the third operative position of the controller the armature-circuit is from conductor $b$, one of the contacts $k^3$ to the lower contact $k$, armature-lead $m$, armature, the other armature-lead $m$, the upper contact $k$, and the other contact $k^3$ to lead $c$. In the fourth operative position of the controller the armature-circuit is from conductor $a$, one of the contacts $k^4$ to the lower contact $k$, armature-lead $m$, armature, the other armature-lead $m$, the upper contact $k$, and the other contact $k^4$ to lead $c$. In the fifth operative position of the controller the armature-circuit is from conductor $b$, one of the contacts $k^5$ to the lower contact $k$, armature-lead $m$, armature, the other armature-lead $m$, the upper contact $k$, and the other contact $k^5$ to lead $d$. In the sixth operative position of the controller the armature-circuit is from conductor $a$, one of the contacts $k^6$ to the lower contact $k$, armature-lead $m$, armature, the other armature-lead $m$, the upper contact $k$, and the other contact $k^6$ to lead $d$.

In the system illustrated in Fig. 2 there are six conductors $a'$ $b'$ $c'$ $d'$ $e'$ $f'$, between which there is a continuous rise or fall of potential in the order named. Between the extreme conductors $a'$ and $f'$ a difference of potential of four hundred and eighty volts is maintained by a generator $G'$. The conductors $b'$, $c'$, $d'$, and $e'$ are maintained at intermediate potentials with respect to the extreme conductors by means of a balancer consisting of five mechanically-connected dynamo-electric machines, which are so proportioned and wound that one of the machines $B'^1$ will maintain a potential difference between its armature-terminals of forty volts, one of the machines $B'^2$ will maintain a potential difference between its armature-terminals of eighty volts, and the remaining three machines $B'^3$ $B'^3$ $B'^3$ will each maintain a potential difference between its armature-terminals of one hundred and twenty volts. These machines are connected in series between the extreme conductors in the order $B'^1$ $B'^3$ $B'^3$ $B'^3$ $B'^2$, and they will consequently subdivide the rise or fall of potential of four hundred and eighty volts between the extreme conductors into the values forty volts, one hundred and twenty volts, one hundred and twenty volts, one hundred and twenty volts, eighty volts, in the order named, in the same manner as the balancer described in connection with Fig. 1. The conductor $b'$ is connected between the machines $B'^1$ and $B'^3$. The conductors $c'$ and $d'$ are each connected between two machines $B'^3$ and $B'^3$, and the conductor $e'$ is connected between two machines $B'^3$ and $B'^2$. The machines consequently maintain the conductors at such potential differences that between conductors $a'$ and $b'$ there will be forty volts potential difference, between conductors $e'$ and $f'$ there will be eighty volts potential difference, between either conductors $b'$ and $c'$ or conductors $c'$ and $d'$ or conductors $d'$ and $e'$ there will be one hundred and twenty volts potential difference, between conductors $a'$ and $c'$ there will be one hundred and sixty volts potential difference, between conductors $d'$ and $f'$ there will be two hundred volts potential difference, between either conductors $c'$ and $e'$ or conductors $b'$ and $d'$ there will be two hundred and forty volts potential difference, between conductors $a'$ and $d'$ there will be two hundred and eighty volts potential difference, between conductors $c'$ and $f'$ there will be three hundred and twenty volts potential difference, between conductors $b'$ and $e'$ there will be three hundred and sixty volts potential difference, between conductors $a'$ and $e'$ there will be four hundred volts potential difference, between conductors $b'$ and $f'$ there will be four hundred and forty volts potential difference, and between conductors $a'$ and $f'$ there will be four hundred and eighty volts potential difference. In this system, with the potential differences in the ratios indicated by the voltages above given, it will be seen that there can be fifteen different selections of two from the six conductors, but several pairs give the same potential difference, and only twelve different voltages can be obtained. These can be formed into an arithmetical series beginning with the common arithmetical difference of the series. The ratios of potential differences indicated by the above voltages are believed to give the least duplication and a series with the greatest number of places. It may be stated generally that in any interconnected system having more than four conductors it is not practicable to so proportion the potential differences between the conductors that an arithmetical series can be obtained with as many places as there are possible ways of pairing the conductors. It may also be stated generally that with any given number of conductors an arithmetical series with the greatest number of places will result in an arrangement in which the common potential difference with which the series begins is maintained between one of the extreme conductors and the adjoining intermediate conductor, the second potential difference of the series is maintained between the other of the extreme conductors and its adjoining intermediate conductor, and between each of the intermediate conductors a potential difference is maintained which is equal to the third potential difference in the series. A controller is provided with contacts $k'^1$ $k'^1$, which connect the armature-terminals with the conductors $a'$ and $b'$; a pair of contacts $k^2$ $k^2$, which connect the armature-terminals with the conductors $e'$ and $f'$; a pair of contacts $k^3$ $k^3$, which connect the armature-terminals with the conductors $b'$ and $c'$; a pair of contacts $k^4$ $k^4$, which connect the armature-terminals with the conductors $a'$ and $c'$; a pair of contacts $k^5 k^5$, which connect the armature-terminals with the conductors $d'$ and $f'$; a pair of contacts $k^6 k^6$, which connect the armature-terminals with the conductors $c'$ and $e'$; a pair of contacts $k^7 k^7$, which connect the armature-terminals with the conductors $a'$ and $d'$; a pair of contacts $k^8 k^8$, which connect the armature-terminals with the conductors $c'$ and $f'$; a pair of contacts $k^9 k^9$, which connect the armature-terminals with the conductors $b'$ and $e'$; a pair of conductors $k^{10} k^{10}$, which connect the armature-terminals with the conductors $a'$ and $e'$; a pair of conductors $k^{11} k^{11}$, which connect the armature-terminals with the conductors $b'$ and $f'$, and a pair of conductors $k^{12} k^{12}$, which connect the armature-terminals with the conductors $a'$ and $f'$. This controller by consecutive movements in one direction connects the armature-terminals to the conductors so as to throw upon the armature the potential differences above given in proper sequence.

What I claim as new, and desire to secure by Letters Patent of the United States, is—

1. In a multiple-voltage system of motor control, the combination of four or more conductors, interconnected sources of supply for all of the conductors for maintaining differences of potential between the conductors such that the conductors may be arranged in an order of rising potential with such unequal differences of potential between adjacent conductors when so arranged that an arithmetical progression may be made of the values of the differences of potential between different pairs of conductors of the system, a motor, and means for changing the connections of the motor and the conductors so as to throw upon the motor the different differences of potential in the order of the arithmetical progression, substantially as described.

2. In a multiple-voltage system of motor control, the combination of four or more conductors, interconnected sources of supply for all of the conductors for maintaining differences of potential between the conductors such that the conductors may be arranged in an order of rising potential with the difference of potential between the pair of conductors adjacent to each other at one end of the order of arrangement of double the value of the difference of potential between the pair of conductors adjacent to each other at the other end of the order of arrangement and the differences of potential between the pair or pairs of intermediate conductors such that an arithmetical progression may be made of the values of the differences of potential between different pairs of conductors of the system, a motor, and means for changing the connections of the motor and the conductors so as to throw upon the motor the different differences of potential in the order of their arithmetical progression, substantially as described.

3. In a multiple-voltage system of motor control, the combination of four or more conductors, interconnected sources of supply for all of the conductors for maintaining differences of potential between the conductors such that the conductors may be arranged in an order of rising potential and when so arranged the differences of potential between the two outside pairs of conductors shall be unequal, and that the difference or differences of potential between the intermediate pair or pairs shall be not less than that of either of the outside pairs of conductors, a motor, and means for changing the connections of the motor and the conductors so as to throw upon the motor the different differences of potential in the order of the values, substantially as described.

4. In a multiple-voltage system of motor control, the combination of four or more conductors, interconnected sources of supply for all of the conductors for maintaining differences of potential between the conductors such that the conductors may be arranged in an order of rising potential and when so arranged the differences of potential between the two outside pairs of conductors shall be unequal, and that the difference or differences of potential between the intermediate pair or pairs shall be greater than that of either of the outside pairs of conductors, a motor, and means for changing the connections of the motor and the conductors so as to throw upon the motor the differences of potential in the order of their values, substantially as described.

5. In a multiple-voltage system of motor control, the combination of four conductors, interconnected sources of supply for all of the conductors for maintaining differences of potential between the conductors such that the conductors may be arranged in an order of rising potential and when so arranged the difference of potential between the pair of conductors adjacent to each other at one end of the order of arrangement shall be of double the value of the difference of potential between the pair of conductors adjacent to each other at the other end of the order of arrangement and the difference of potential between the pair of intermediate conductors shall be of greater value than the difference of potential between the pairs at either extreme, a motor, and means for changing the connections of the motor and the conductors so as to throw upon the motor the different potential differences in the order of their values, substantially as described.

6. In a multiple-voltage system of motor control, the combination of four conductors, interconnected sources of supply for all of the conductors for maintaining differences of potential between the conductors such that the conductors may be arranged in an order of rising potential and when so arranged the difference of potential between the pair of conductors adjacent to each other at one end of the order of arrangement shall be of double the value of the difference of potential between the pair of conductors adjacent to each other at the other end of the order of arrangement and the difference of potential between the pair of intermediate conductors shall be of triple the value of the difference of potential between the outside pair of conductors with the lesser potential difference, a motor, and means for changing the connections of the motor and the conductors so as to throw upon the motor the different potential differences in the order of their values, substantially as described.

7. In a multiple-voltage system of motor control, the combination of four conductors, $a$ $b$ $c$ and $d$, a motor, a controller for the motor, and contacts operated by consecutive movements of the controller in one direction for connecting the motor successively with the pair of conductors $a$ and $b$, the pair of conductors $c$ and $d$, the pair of conductors $b$ and $c$, the pair of conductors $a$ and $c$, the pair of conductors $b$ and $d$, and the pair of conductors $a$ and $d$, substantially as described.

Signed by me at Ampere, New Jersey, this 16th day of June, 1903.

GANO S. DUNN.

Witnesses:
EDWIN RUST DOUGLAS,
M. E. SAMMIS.